(12) United States Patent
Dworak, Jr.

(10) Patent No.: US 8,882,057 B2
(45) Date of Patent: Nov. 11, 2014

(54) PIPE SUPPORT

(71) Applicant: Cooper B-Line, Inc., Houston, TX (US)

(72) Inventor: Dallas Martin Dworak, Jr., Redlands, CA (US)

(73) Assignee: Cooper B-Line, Inc., Houston, TX (US)

( * ) Notice: Subject to any disclaimer, the term of this patent is extended or adjusted under 35 U.S.C. 154(b) by 0 days.

(21) Appl. No.: 13/631,500

(22) Filed: Sep. 28, 2012

(65) Prior Publication Data
US 2013/0168510 A1    Jul. 4, 2013

Related U.S. Application Data

(63) Continuation-in-part of application No. 13/480,353, filed on May 24, 2012.

(60) Provisional application No. 61/540,174, filed on Sep. 28, 2011.

(51) Int. Cl.
| | |
|---|---|
| *F16L 3/12* | (2006.01) |
| *F16L 3/10* | (2006.01) |
| *F16L 3/123* | (2006.01) |
| *A62C 35/68* | (2006.01) |

(52) U.S. Cl.
CPC ............... *F16L 3/1083* (2013.01); *F16L 3/123* (2013.01); *A62C 35/68* (2013.01)
USPC .............................. 248/74.1; 248/62; 248/65

(58) Field of Classification Search
USPC ........ 248/56, 58, 60, 61, 62, 65, 68.1, 71, 73, 248/74.1, 74.3, 74.4; 174/74 A, 74 R, 80
See application file for complete search history.

(56) References Cited

U.S. PATENT DOCUMENTS

| | | |
|---|---|---|
| 2,998,217 A | 8/1961 | Englis et al. |
| 6,293,504 B1 | 9/2001 | Hartmann |

(Continued)

FOREIGN PATENT DOCUMENTS

| | | |
|---|---|---|
| EP | 0657671 | 10/1997 |
| FR | 2792975 | 11/2000 |

(Continued)

OTHER PUBLICATIONS

PCT/US2012/057956; filed Sep. 28, 2012; Cooper B-Line, Inc.; international search report dated May 4, 2013.

(Continued)

*Primary Examiner* — Steven Marsh
(74) *Attorney, Agent, or Firm* — Thorpe North & Western LLP

(57) ABSTRACT

A pipe support is disclosed for restraining a pipe at a position in close proximity to a joint formed by the pipe and a pipe fitting. The pipe support includes a base configured to be secured to a support surface and to interface with an outer surface of the pipe. The pipe support also includes a clamp operable with the base to restrain the pipe. Additionally, the pipe support includes a hinge coupling the base and the clamp, operable to facilitate relative movement between the base and the clamp. The base positions the outer surface of the pipe at a pre-determined distance from the support surface sufficient to at least offset a distance between the outer surface of the pipe and an outer surface of the pipe fitting, thereby preventing a bending load from occurring at the joint upon securing the pipe support to the support surface.

11 Claims, 4 Drawing Sheets

(56) References Cited

U.S. PATENT DOCUMENTS

| | | | |
|---|---|---|---|
| 6,892,990 B2 * | 5/2005 | Pisczak | 248/74.4 |
| 7,010,889 B1 * | 3/2006 | Renfro | 52/219 |
| 7,441,732 B2 | 10/2008 | Ferragut et al. | |
| 7,467,767 B2 * | 12/2008 | Miles et al. | 248/74.1 |
| 7,770,848 B2 * | 8/2010 | Johnson et al. | 248/65 |
| 2006/0213039 A1 * | 9/2006 | Sampson | 24/530 |
| 2009/0045300 A1 | 2/2009 | Vander Griend | |
| 2009/0091125 A1 * | 4/2009 | Takeda et al. | 285/88 |
| 2010/0219301 A1 * | 9/2010 | Sampson | 248/74.1 |

FOREIGN PATENT DOCUMENTS

| | | |
|---|---|---|
| JP | 08/004947 | 1/1996 |
| WO | WO 2013/049594 | 4/2013 |

OTHER PUBLICATIONS

U.S. Appl. No. 13/480,353, filed May 24, 2012; Dallas Martin Dworak Jr.; office action dated Sep. 20, 2013.

U.S. Appl. No. 13/480,353, filed May 24, 2012; Dallas Martin Dworak Jr.; office action dated Aug. 15, 2014.

* cited by examiner

PIPE SUPPORT

CROSS-REFERENCE TO RELATED APPLICATIONS

This application is a continuation in-part application, and claims the benefit of U.S. application Ser. No. 13/480,353 filed on May 24, 2012, and U.S. Provisional Application No. 61/540,174 filed on Sep. 28, 2011, each of which are incorporated by reference herein in their entirety

BACKGROUND

Often, it is desirable to restrain or secure pipes, such as fire sprinkler pipes, within or to a building or other structure. In many cases, pipes are required to be restrained in accordance with seismic or earthquake building codes and regulations. Such codes may set forth requirements pertaining to the location and number of restraints with respect to a pipe. For example, a code may place requirements on a suitable pipe support, such as a pipe hanger, that may be used in a mid-region between joints or pipe fittings. Additionally, a code may place requirements on a suitable pipe support, such as a brace, that may be used in close proximity to a joint or pipe fitting. Such requirements typically specify a minimum load that the pipe support can withstand, with pipe supports in close proximity to joints typically having greater load requirements than pipe supports in mid-regions between joints, for example. Traditional pipe supports, particularly those for use in close proximity to a joint or pipe fitting, include multiple individual components, such as a clamp and multiple fasteners, which require time consuming assembly at the time of installation. Additionally, typical pipe supports require a separate spacer if they are to be used in close proximity to a joint or pipe fitting in order to prevent inducement of a bending load on the joint due to installation of the pipe support near the joint.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1A:
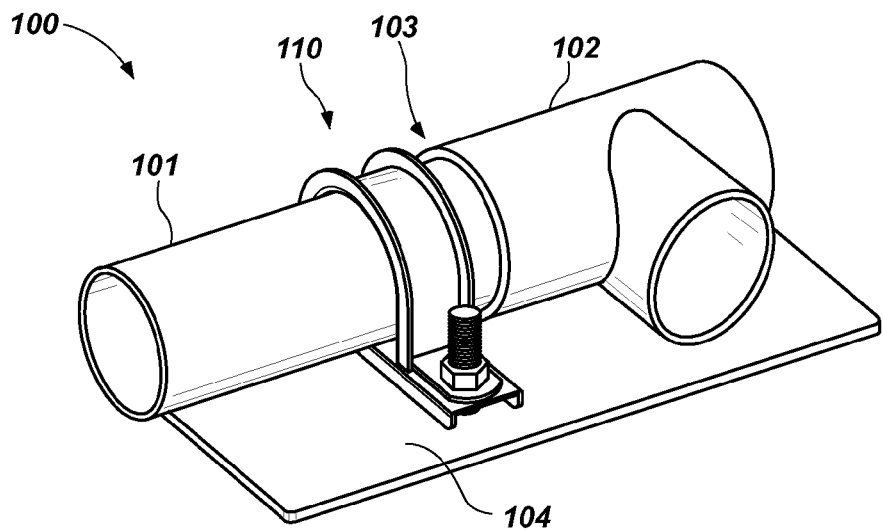
FIG. 1A is an example illustration of a pipe support system in accordance with an exemplary embodiment of the present invention.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Although traditional pipe supports, when installed properly, are adequate for the task and satisfy code requirements, the assembly of multiple components, including a spacer and multiple fasteners, can present complexity that slows the installation process. Additionally, the multitude of individual components, such as spacers and fasteners often used for installation of a single pipe support can lead to significant costs due to the quantities needed for many commercial buildings. Moreover, as it has become common to use different types of pipe supports at different support locations about the pipe, namely hangers and braces, installation costs can be further increased due to the increased number and type of needed parts.

Accordingly, a pipe support is disclosed for restraining a pipe at a position in close proximity to a joint formed by the pipe and a pipe fitting. The pipe support can comprise a base configured to be secured to an object (e.g., a beam, joist, truss, stud, etc.) or a support surface (e.g., of a building or other structure) and to interface with an outer surface of the pipe. The pipe support can also comprise a clamp operable with the base to restrain the pipe, wherein the base and the clamp are of sufficient strength and comprise sufficient stiffness such that the pipe support can function both as a hanger and a restrainer or brace for piping. Additionally, the pipe support can comprise a hinge coupling the base and the clamp, wherein the hinge can be operable to facilitate relative movement between the base and the clamp. The base can be configured to position the outer surface of the pipe at a predetermined distance from the support surface sufficient to at least offset a distance between the outer surface of the pipe and an outer surface of the pipe fitting, thereby preventing a bending load from occurring at the joint upon securing the pipe support to the pipe and the support surface. In one exemplary embodiment, the pipe support can comprise a single, unitary assembly.

The pipe support can further be configured to use only a single fastener for installation. Indeed, the pipe support can be designed to be fastened to the object (e.g., a beam, truss, joist, stud, wall, etc.) by a single fastener. For instance, the pipe support can comprise a base or base portion, a clamp, and a hinge as discussed herein. The hinge an facilitate the clamp to be moved or manipulated from an initial open orientation to an installed orientation, wherein the base and the clamp together create an interior space configured to receive and accommodate a pipe. The clamp can comprise an opening or hole that aligns with an opening or hole in the base in the installed orientation, such that a single fastener can retain the pipe support in the installed orientation and secure the pipe support to an object or support surface. Such an arrangement advantageously reduces the installation time of the pipe support. Because many pipe hangers and/or restrainers are typically used in a single installation, even a small reduction in installation time for each pipe support results in a significant time savings for an entire project.

A pipe support system is also disclosed. The pipe support system can comprise a pipe, a pipe fitting coupled to the pipe to form a joint, and a pipe support capable of restraining the pipe in close proximity to the fitting. The pipe support can comprise a base configured to be secured to a support surface and to interface with an outer surface of the pipe. The pipe support can further comprise a clamp operable with the base to restrain the pipe, as well as a hinge coupling the base and the clamp, wherein the hinge is operable to facilitate relative movement between the base and the clamp. The base can be configured to position the outer surface of the pipe at a predetermined distance from the support surface sufficient to at least offset a distance between the outer surface of the pipe and an outer surface of the pipe fitting, thereby preventing a bending load from occurring at the joint upon securing the pipe support to the pipe and the support surface.

Figure 1B:
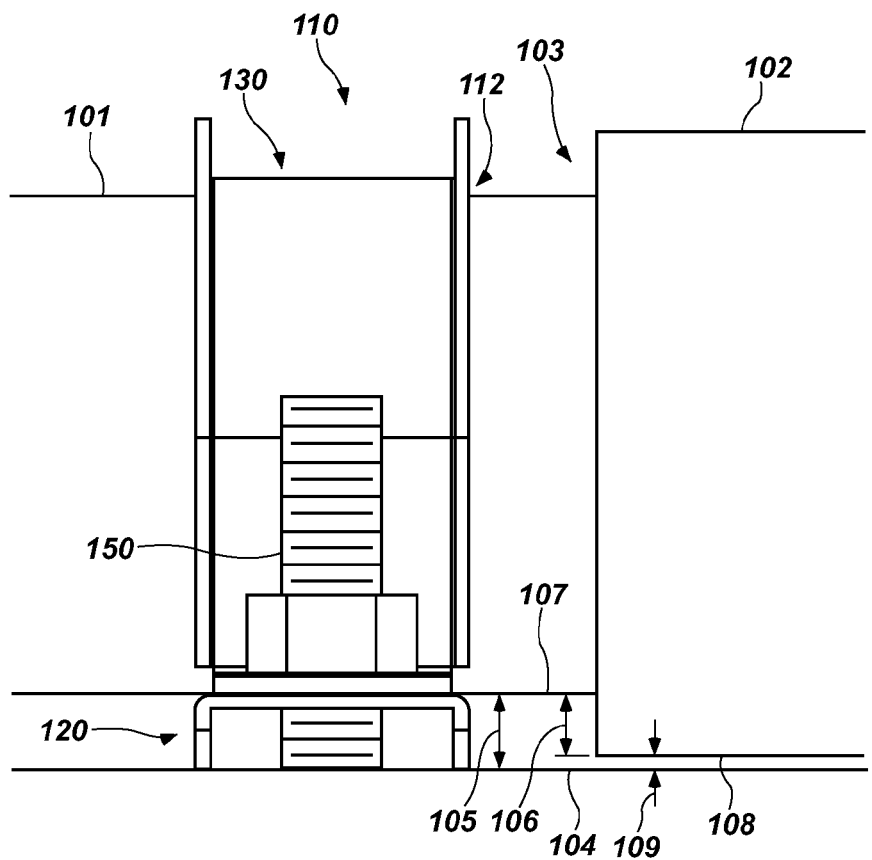
FIG. 1B is a side view of the pipe support system of FIG. 1A.

One exemplary embodiment of a pipe support system 100 is illustrated in FIGS. 1A and 1B. The pipe support system 100 can include a pipe 101. The pipe 101 can be constructed of any material, such as PVC, ABS, copper, cast iron, steel, etc., and can be used for any purpose, such as conveying a fluid or a gas. The pipe support system 100 can also include a pipe fitting 102 coupled to the pipe 101 to form a joint 103. The pipe fitting 102 can be constructed of any material suitable for forming a joint with the pipe 101. In some aspects, an adhesive, cement, glue, weld, braze, etc. may be utilized to secure the pipe 101 to the pipe fitting 102. In one embodiment, the pipe 101 and the pipe fitting 102 can be constructed of PVC and secured to one another with a cement to form the joint 103. Such a pipe and pipe fitting can be used in a fire sprinkler system for a building, for example. However, other systems, applications or uses are contemplated. Additionally, the pipe support system 100 can include a pipe support 110 capable of restraining the pipe 101 in close proximity to the pipe fitting 102. The pipe supports disclosed herein are capable of satisfying code requirements for restraining a pipe in close proximity to a joint or in a mid-region of the pipe between joints. This multi-use or dual-purpose potential of the pipe supports disclosed herein can provide flexibility in installation and can simplify manufacture, procurement, inventory management, and installation in terms of the pipe supports needed for a given project.

Figure 2A:
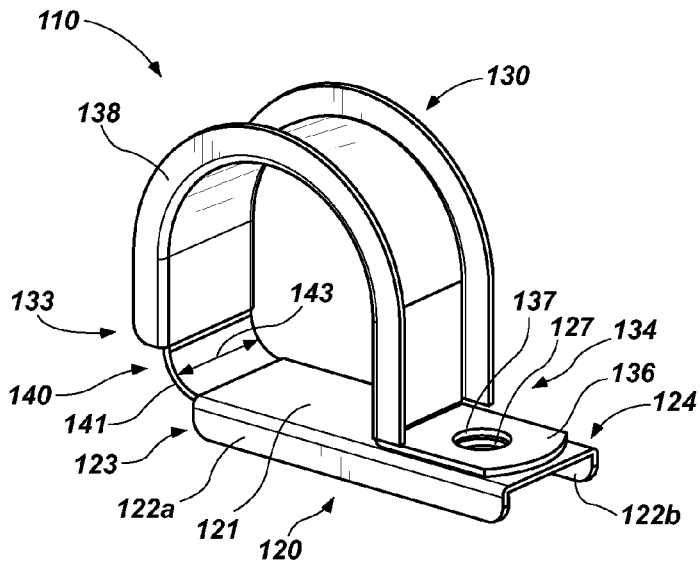
FIG. 2A is an example illustration of a pipe support in accordance with an exemplary embodiment of the present invention.
Figure 2B:
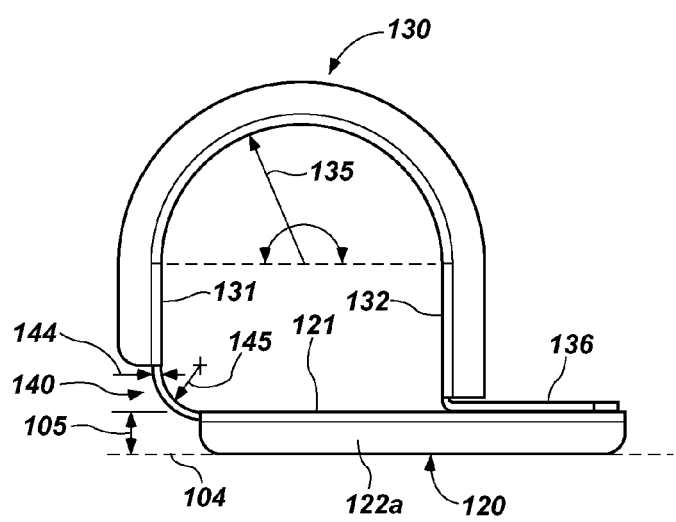
FIG. 2B is a side view of the pipe support of FIG. 2A in a closed configuration.
Figure 2C:
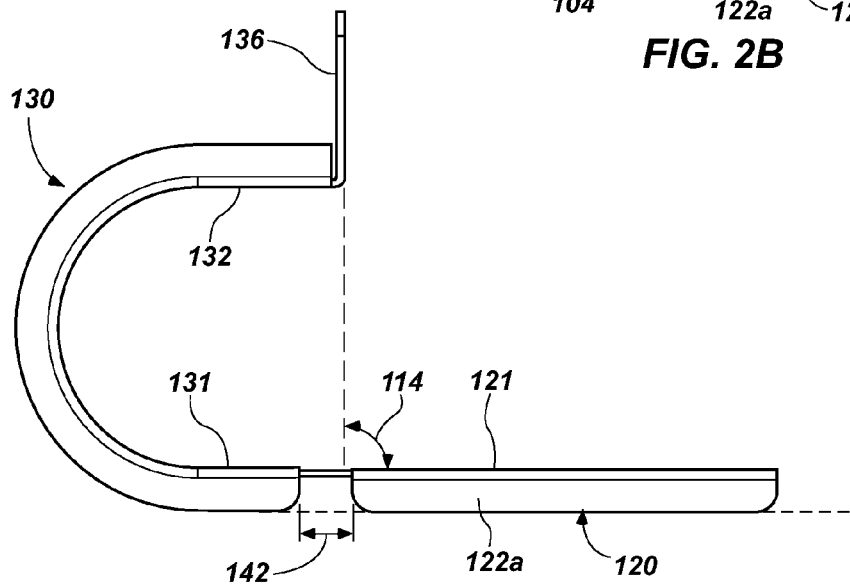
FIG. 2C is a side view of the pipe support of FIG. 2A in an open configuration.

With reference to FIGS. 2A-2C, and with continuing reference to FIGS. 1A and 1B, the pipe support 110 can comprise a base 120 or base portion configured to be secured to a support surface 104 or other such object (e.g., a structural component (e.g., wall) of a building or other structure) and to interface with an outer surface of the pipe 101. The pipe support 110 can also comprise a clamp 130 or retaining portion operable with the base 120 to restrain the pipe 101. The base and the clamp can be designed such that the pipe support is capable of functioning both as a hanger and a restrainer or brace for piping. Specifically, the base 120 and the clamp 130 can be configured to comprise sufficient strength and stiffness properties to enable the pipe support to be used as a hanger or as a restrainer (i.e., to be secured to a pipe in close proximity to a pipe fitting). In addition, the pipe support 110 can comprise a hinge 140 or hinge portion coupling the base 120 and the clamp 130. The hinge 140 can be operable to facilitate relative movement between the base 120 and the clamp 130. The hinge 140 can be configured to be easier to bend than other parts or components of the pipe support 110. For example, the hinge 140 can comprise a reduction of mass relative to the adjacent portions of the pipe support 110, which may comprise removal of material or thinning of the material, or both. The hinge can include one more slots oriented in or which extend in a direction substantially aligned with the axis of rotation or bending axis.

In one embodiment, the pipe support 110 can comprise a single assembly, which can be formed by a single, one-piece, monolithic or unitary construction of the base 120, the hinge 140, and the clamp 130, wherein the clamp can be secured to the base using a single fastener. For example, holes formed in the base and the clamp can be configured to align upon actuation of the hinge to secure the pipe support 110 to the pipe 101, and a single fastener inserted through the aligned holes to secure the pipe support 110 to the support surface or object.

The base 120 can comprise a platform 121 or pipe interface surface of the base 120 supported about one or more ribs, or risers, such as risers 122a, 122b that extend outward from the base 120. The risers 122a, 122b can be configured to interface with the support surface 104 to support the platform 121 in an elevated position above the support surface 104. In other words, the riser or flange can extend away from and create a standoff relative to the platform 121 or pipe interface surface of the base 120. The risers 122a, 122b can also be configured to enhance the strength and stiffness properties of the base 120 to acceptable levels that would enable the pipe support 110 to function as a restrainer or brace in accordance with applicable building codes. The platform 121 can be configured to receive and interface with the pipe 101, and particularly the outer surface 107 of the pipe 101 (as shown in FIG. 1B). In one aspect, at least two risers 122a, 122b can be arranged in parallel to support the platform 121. For example, the platform 121 and the risers 122a, 122b can be configured such that the base 120 forms a channel or U-shape. Thus, as shown and described herein, the base can include one or more risers. Additionally, as described further below, it is contemplated that a riser and a platform can be part of a single unitary structure or form parts of separate structures coupled to one another.

Figure 3A:
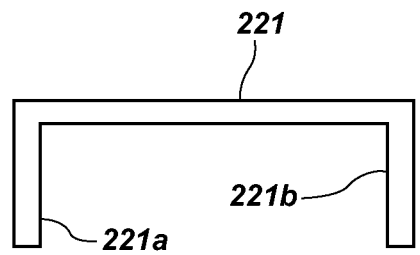
FIG. 3A is an example illustration of a riser and a platform of a pipe support in accordance with an exemplary embodiment of the present invention.
Figure 3B:
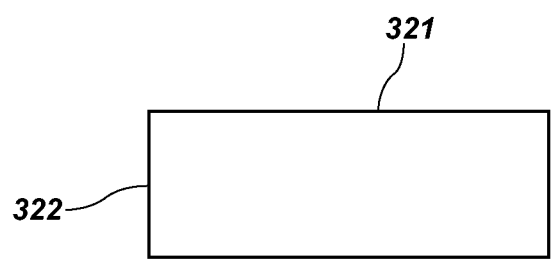
FIG. 3B is an example illustration of a riser and a platform of a pipe support in accordance with another exemplary embodiment of the present invention.
Figure 3C:
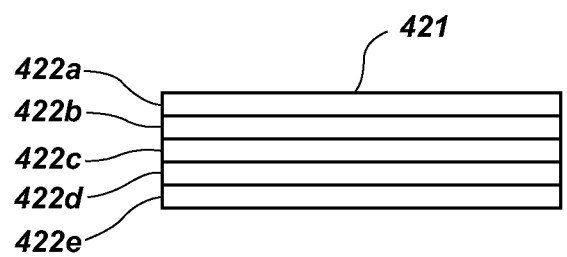
FIG. 3C is an example illustration of a riser and a platform of a pipe support in accordance with yet another exemplary embodiment of the present invention.

As illustrated in FIGS. 3A-3C, a single riser can comprise a thin, narrow structure, such as riser 221a or riser 221b (FIG. 3A) or a single riser can comprise a thick, solid structure, such as riser 322 (FIG. 3B). Additionally, thin risers 221a, 221b can be in a perpendicular orientation relative to the platform 221. In another aspect, a riser can comprise a plurality of structures in a parallel orientation relative to a platform, such as the stack of thin risers 422a-422e shown relative to platform 421 (FIG. 3C). Moreover, FIGS. 3A-3C illustrate that a platform can comprise, at least in part, an upper surface of a riser. For example, platform 221 can comprise, at least in part, an upper surface of riser 221*a* and/or riser 221*b*. Likewise, platform 321 can comprise an upper surface of riser 322. Platform 421 can comprise an upper surface of riser 422*a*. These examples illustrate some of the many different configurations of how a base can be formed and configured, but these should not be construed as limiting in any way.

With particular reference to FIG. 1B, and further reference to FIGS. 1A and 2A-2C, the pipe support 110 is shown as being in close proximity to a pipe fitting 102. The base 120 can be configured to position the outer surface 107 of the pipe 101 at a pre-determined distance 105 from the support surface 104 as the pipe 101 is supported on or about the base 120. In a sense, it can be said that the base 120 can provide a "built-in" spacer to position the outer surface 107 of the pipe 101 at a pre-determined distance 105 from the support surface 104. The distance 105 can be sufficient to at least offset a distance 106 between the outer surface 107 of the pipe 101 and an outer surface 108 of the pipe fitting 102, which can prevent a bending load from occurring at the joint 103 upon securing the pipe support 110 to the pipe 101 and the support surface 104. In other words, the platform 121 can be positioned, such as by the risers 122*a*, 122*b*, at a predetermined distance from a lower surface of the base 120, which can be in contact with the support surface 104. The platform 121 can therefore be separated or offset from the support surface 104 by the pre-determined distance 105, which meets or exceeds the distance 106 between the outer surface 107 of the pipe 101 and an outer surface 108 of the pipe fitting 102. This prevents the support surface 104 applying an unwanted force against the pipe fitting 102 when the pipe 101 is secured by the pipe support 110, which would tend to induce a bending load in the joint 103 as well as contact stress at location 112 between the pipe 101 and the clamp 130. The distance 105 can be at least as great as the distance 106 in order to prevent a bending load from occurring at the joint 103 when the pipe support 110 is secured to the pipe 101 and the support surface 104. In other words, a distance 105 that is equal to or greater than the distance 106 will reduce or eliminate the potential for a bending load at the joint 103. In one aspect, the distances 105 and 106 can be such that a clearance 109 is provided between the outer surface of the pipe fitting 102 and the support surface 104.

As further shown in FIGS. 2A-2C, the pipe support 110 can comprise a hinge 140 operably coupling the base 120 to the clamp 130. The hinge can facilitate installation of the pipe support 110 about the pipe 101. As the pipe support 110 is installed about the pipe 101, the pipe support 110 can slide along a length of the pipe 101 to a proper installation position on the pipe 101 prior to the pipe support 110 being secured to the pipe 101 (e.g., by securing or fastening the base 120 to the clamp 130). The hinge 140 can comprise a compliant ligament 141. In the example shown, the compliant ligament 141 comprises a strip of material extending between the base 120 and the clamp 130, which is capable of undergoing bending. The strip can be formed of metal or another suitable material. In this case, the strip of material, or the compliant ligament 140, the base 120 and the clamp 130 comprise a unitary structure, with the compliant ligament being formed and defined by a bend in the material, and having a reduced width 143.

In general, the compliant ligament 141 can be coupled to a fixed end portion 123 of the base 120 and to a fixed end portion 133 of the clamp 130. Actuation of the hinge 140, namely bending of the compliant ligament 141, can allow a free end portion 134 of the clamp 130 to move relative to a free end portion 124 of the base 120, which can permit the pipe support 110 to receive and secure the pipe 101. In other words, the fixed end portion 123 of the base 120 can be separated from the fixed end portion 133 of the clamp 130 by the hinge 140. The compliant ligament 141 of the hinge 140 can be of any suitable length 142 to allow the clamp 130 and base 120 to pivot relative to one another about the hinge 140. In one aspect, the length 142 and configuration of the compliant ligament 141 can be configured to limit stress in the ligament caused by the relative rotation between the clamp 130 and the base 120. For instance, the compliant ligament 141 can be configured such that the hinge 140 is capable of undergoing at least 10 close and open cycles to a position of at least 90 degrees of relative rotation 114 between the clamp 130 and the base, with the pipe support still being usable. Other configurations of compliant ligaments are contemplated herein, with those shown in the drawings and described herein not intending to be limiting in any way.

As illustrated in FIG. 2B, the clamp 130 can include a curved section or radius 135 that is configured to extend about halfway around the pipe 101, and to accommodate a radius of the pipe 101. The clamp can be configured to at least partially define an interior space that accommodates the pipe when the pipe support is in an installed orientation and position. In one aspect, although not to be limiting, the radius 135 can be substantially the same as a radius of the pipe 101. In a further aspect, the radius 135 can be pre-formed and permanent or fixed, remaining substantially unaffected when the clamp 130 secures the pipe 101. Straight sections 131, 132 can extend from each end of the curved section or radius 135 of the clamp 130. Straight section 131 can terminate at the fixed end portion 133 of the clamp 130 and straight section 132 can terminate at the free end portion 134 of the clamp 130. The straight section 131 can be coupled to the hinge 140, such as an end of the compliant ligament 141. The straight section 132 can be coupled to a tab 136, which can be configured to secure the free end portion 134 of the clamp 130 to the free end portion 124 of the base 120. For example, the tab 136 can be configured to interface with a fastener 150 (as in FIG. 1B), such as with an opening 137. The base 120 can also include an opening 127 to allow passage of the fastener 150 therethrough when aligned with the opening 137 in the tab 136. The fastener 150 can therefore couple the free end portion 134 of the clamp 130 to the free end portion 124 of the base 120 as well as secure the pipe support 110 to the support surface 104 in order to secure the pipe 101 to the pipe support 110. One advantage of the pipe supports of the present disclosure over typical pipe supports is that the free end portion 134 of the clamp 130 can be secured or coupled to the base 120 using only a single fastener. Indeed, in the embodiment shown, the tab 136, as extending orthogonally from the free end of the clamp 130 can be caused engage and couple to the base 120 as the clamp 130 and the base 120 are moved relative to one another to close the pipe support 110. The base 120 can comprise a portion or segment that extends some distance beyond the free end of the clamp 130 (with the pipe support 110 in the closed position), thus providing a space for the tab 136 to interface with and couple to the base 120. In this position, the openings 127 and 137 can be caused to align and a fastener inserted therethrough to secure the pipe support 110 around the pipe 101. It should be recognized that the fastener 150 can include a bolt, screw, nut, rivet, or any other suitable attachment structure, system, device or method.

In addition, when the pipe support 110 is in the configuration shown in FIG. 2B, the compliant ligament 141 of the hinge 140 can have a radius 145. The radius 145 of the compliant ligament 141 can result from moving the clamp 130 from an open position (as shown in FIG. 2C) to a closed position (as shown in FIG. 2B). Thus, the radius 145 can result from the length 142 of the compliant ligament 141 as well as the angle of rotation between the clamp 130 and the base 120. As shown in FIG. 2B, the radius 145 of the compliant ligament 141 can be configured such that it is different (typically smaller) from the radius 135 of the clamp 130. This feature can function to ensure that no portion of the compliant ligament 141 of the hinge 140 will contact the pipe 101 when the pipe support 110 is securing the pipe 101, if desired.

The pipe support 110 can be configured to confine substantially all bending and deflection to the hinge 140, and particularly the compliant ligament 141, as the clamp 130 is moved between open and closed positions. In other words, the pipe support 110 can be configured such that it is the compliant ligament 141 that flexes and bends rather than the base 120 and/or the clamp 130, wherein flexing or bending is not distributed across the hinge 140, base 120, and clamp 130, but is confined or isolated to the hinge 140. The elements of the pipe support 110 are therefore configured to provide controlled deflection meaning that, as the pipe support is opened and/or closed, deflection therein is controlled to be within or confined to a specific component or location or segment of the pipe support 110. To help facilitate this, in one aspect, the compliant ligament 141 can have a reduced material width 143 and/or thickness 144 to reduce the cross-sectional area compared to the base 120 and/or the clamp 130. In another aspect, the compliant ligament can comprise a reduction of material compared to the base 120 or clamp 130 (e.g., holes, scoring, perforations, etc.). In still another aspect, the base 120 and/or the clamp 130 can have features or structure configured to provide increased bending stiffness relative to the compliant ligament 141. In one particular example of this, the clamp 130 can comprise a flared edge 138 configured to prevent the edge from contacting the pipe 101. The flared edge 138 can further function in a similar manner as the risers operable with the base, namely to increase the strength and stiffness properties of the clamp 130 sufficient to enable the pipe support to be used as a restrainer or brace in addition to just a hanger. Indeed, in one aspect, the flared edge 138 can enhance strength and stiffness of the clamp 130 to minimize or prevent bending of the clamp 130 during use. In another aspect, the risers 122a, 122b can be configured to enhance strength and stiffness of the base 120 to minimize or prevent bending of the base 120 during use. Sufficient strength and stiffness of the clamp 130 and base 120 relative to the hinge 140 or compliant ligament 141 can increase the functionality of the pipe support as discussed herein, as well as confine substantially all bending and deflection to the hinge 140 as the clamp 130 is moved between open and closed positions.

Figure 4A:
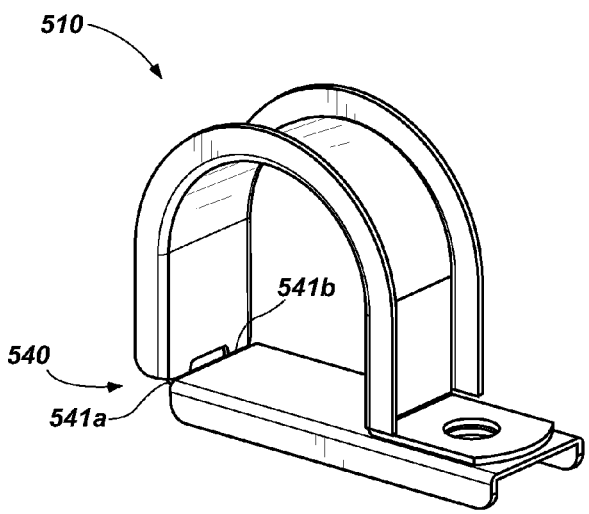
FIG. 4A is an example illustration of a pipe support in accordance with another exemplary embodiment of the present invention.
Figure 4B:
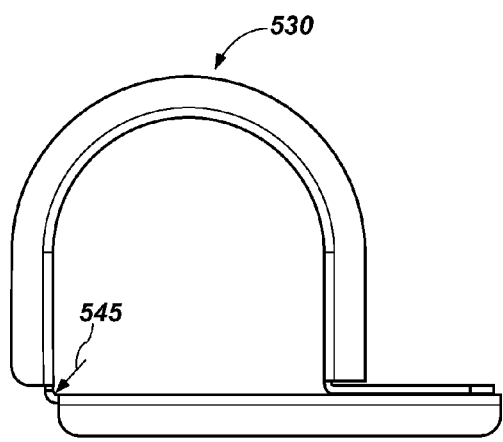
FIG. 4B is a side view of the pipe support of FIG. 4A.

With reference to FIGS. 4A and 4B, another exemplary pipe support 510 is illustrated with a hinge 540 that comprises a plurality of compliant ligaments 541a, 541b. As compared to the compliant ligament 141 of FIGS. 2A-2C, the compliant ligaments 541a, 541b are relatively short and have a relatively small cross-sectional area. The relatively short length of compliant ligaments 541a, 541b results in a smaller radius 545 when the clamp 530 is in the closed position (FIG. 4B). The length and cross-sectional area (i.e., with and/or thickness) of a compliant ligament can therefore vary to a substantial degree.

Figure 5:
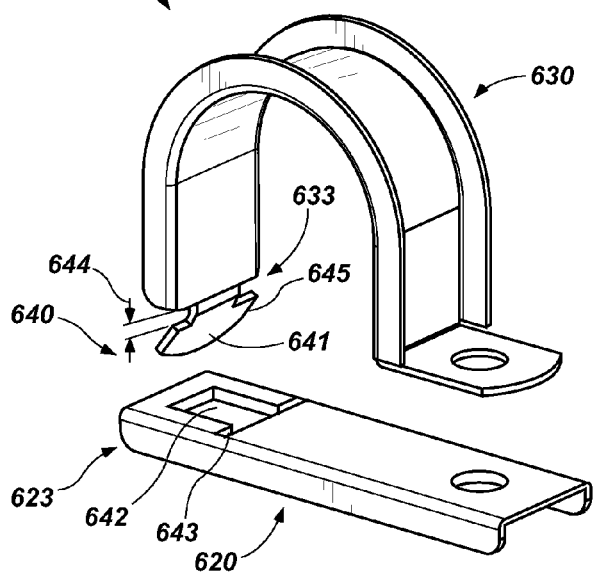
FIG. 5 is an example illustration of a pipe support in accordance with yet another exemplary embodiment of the present invention.

With reference to FIG. 5, still another exemplary pipe support 610, which comprises a separable two-piece hinge 640. In this embodiment, the hinge 640 lacks a compliant ligament, as discussed above, which permanently couples a base and a clamp to one another. Instead, the clamp 630 is removably attachable to the base 620 upon assembly of the hinge 640. As other designs or configurations are contemplated, in one exemplary embodiment the two-piece hinge 640 can comprise a T-bar 641 formed at a fixed end portion 633 of the clamp 630, and a slot 642 formed at a fixed end portion 623 of the base 620. The T-bar 641 can be removably inserted into the slot 642 to assemble the hinge 640. In one aspect, the slot 642 comprises a T-slot and the T-bar 641 is insertable into the "cross" 643 of the "T". The T-bar 641 can slide toward the fixed end portion 623 of the base 620 to complete assembly of the two-piece hinge 640. A gap 644 in the T-bar 641 can be configured to position the "cross" 645 of the T-bar 641 on an underside of the base 620 and to allow rotation of the hinge 640, such that the clamp 630 can rotate relative to the base 620 as facilitated by the hinge 640. The T-bar 641 can also be disposed at an angle to enhance rotation and/or range of motion of the hinge 640, or to provide more optimal positioning of the base relative to the clamp with the hinge in a specific position. Despite the two-piece nature of the hinge 640, in one aspect, the pipe support 610 can comprise a single unit, wherein the two-piece hinge 640 can be pre-assembled prior to installation, with the base 120 and the clamp 130 coupled to one another via the hinge 640. In this way, an installer of pipe supports can easily select the pipe support 610 pre-assembled as a single unit from a container or package of many pipe supports 610, without the need of selecting and assembling the components on-site. As with other embodiments, a single fastener can then be used to secure together the free ends of the clamp and the base about a pipe, as well as to the support surface.

Referring gain to FIGS. 2A-2C, the pipe support or hanger 110 can be made from any suitable material by any suitable manufacturing process. Preferably, the pipe hanger 110 is made from a sheet metal material, which may be galvanized. Preferably, the pipe hanger 110 is manufactured by a stamping process, which may be a multi-step, progressive stamping process that occurs on a single stamping press. However, the stamping process may occur as a series of separate steps on the same stamping press or on different stamping presses. In any event, the pipe hanger 110 preferably begins as a generally or substantially flat work piece (e.g., a strip or roll of metal material), has the openings 127, 137 created (e.g., by a punching operation), is trimmed to a suitable outside shape including removal of material to form the hinge portion 140, has the flanges or risers 122a, 122b bent relative to the remainder of the pipe hanger 110 and has the retaining portion 130 bent to an appropriate shape. These steps may be done in any suitable order. Preferably, the resulting pipe hanger is substantially similar or identical to the pipe hanger 110 shown in FIG. 2C. As discussed, the pipe hanger 110 is bent into the installed orientation (FIGS. 2A and 2B by the end user.

The above-described method is especially suited for automated stamping lines, wherein stamping, punching and bending operations can be efficiently executed. The simplicity and speed of this manufacturing method results in an end-product that is economical to manufacture and, therefore, reduces the cost for the end consumer. Of course, alternatively, the pipe hanger 20 may be otherwise manufactured, but the alternative processes may be more time consuming and, consequently, more expensive.

In accordance with one embodiment of the present invention, a method of facilitating restraint of a pipe at a position in close proximity to a joint formed by the pipe and a pipe fitting is disclosed. The method can comprise providing a pipe support having a base configured to be secured to a support surface and to interface with an outer surface of the pipe, a clamp operable with the base to restrain the pipe, and a hinge coupling the base and the clamp, and operable to facilitate relative movement between the base and the clamp. The method can further comprise facilitating positioning of the outer surface of the pipe, with the base, at a pre-determined distance from the support surface sufficient to at least offset a distance between the outer surface of the pipe and an outer surface of the pipe fitting, thereby preventing a bending load from occurring at the joint upon securing the pipe support to the pipe and the support surface. In one aspect, the method can further comprise facilitating securing the pipe support to the support surface using a single fastener, thus simplifying installation, as well as reducing installation times and associated installation costs.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, it is possible that well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A pipe hanger, comprising:
    a base portion comprising a flange that extends away from a pipe interface surface of the base portion, the flange providing a standoff distance of the pipe interface surface relative to a support surface, the base portion further comprising an opening;
    a retaining portion comprising an opening; and
    a hinge portion that permits the retaining portion to be bent from an initial orientation toward the pipe interface surface of the base portion toward an installed orientation, wherein the base portion and retaining portion together create an interior space configured to accommodate a pipe in the installed orientation,
    wherein the opening of the retaining portion aligns with the opening of the base portion in the installed orientation such that a single fastener can retain the pipe hanger in the installed orientation and secure the pipe hanger to the support surface with the flange between the support surface and the pipe.

2. The pipe hanger of claim 1, wherein the base portion comprises a flange extending from each side edge.

3. The pipe hanger of claim 2, wherein the retaining portion comprises a flange extending from each side edge, wherein the flanges extend away from the interior space when the pipe hanger is in the installed orientation.

4. The pipe hanger of claim 3, wherein the hinge portion does not include a flange.

5. The pipe hanger of claim 3, wherein a rounded surface is defined between the flanges and the interior surfaces that define the interior space.

6. The pipe hanger of claim 1, wherein the pipe interface surface of the base portion is substantially planar and the retaining portion includes curved portion.

7. The pipe hanger of claim 1, wherein the retaining portion comprises a tab and the opening of the retaining portion is located in the tab.

8. The pipe hanger of claim 1, wherein the hinge portion is created by a removal of material mass relative to adjacent portions of the pipe hanger.

9. A pipe hanger, comprising:
    a base portion comprising a flange that extends away from a pipe interface surface of the base portion, the flange providing a standoff distance of the pipe interface surface relative to a support surface, the base portion further comprising an opening;
    a retaining portion comprising an opening; and
    a hinge portion that permits an end of the retaining portion opposite the opening to be secured in an installed orientation relative to an end of the base portion opposite the opening, wherein the base portion and retaining portion together create an interior space configured to accommodate a pipe in the installed orientation,
    wherein the opening of the retaining portion aligns with the opening of the base portion in the installed orientation such that a single fastener can retain the other ends of the retaining portion and the base portion in the installed orientation and secure the pipe hanger to the support surface with the flange between the support surface and the pipe.

10. The pipe hanger of claim 9, wherein the retaining portion and the base portion are formed by a unitary piece of material.

11. The pipe hanger of claim 9, wherein the retaining portion and the base portion are formed by separate pieces of material, wherein the ends of the retaining portion and the base portion opposite the respective openings are secured together by a tab and slot arrangement.

* * * * *